Inventor
Alexander Procofieff-Seversky

Jan. 7, 1936.   A. PROCOFIEFF-SEVERSKY   2,027,348
SIGHTING CONTROL FOR AIRCRAFT
Original Filed April 10, 1922   7 Sheets-Sheet 4

Inventor
Alexander Procofieff-Seversky
By Ernest E. Harnery his Attorney

Fig. 8.

Jan. 7, 1936.　　　A. PROCOFIEFF-SEVERSKY　　　2,027,348
SIGHTING CONTROL FOR AIRCRAFT
Original Filed April 10, 1922　　　7 Sheets-Sheet 6

Inventor
Alexander Procofieff-Seversky
By
Ernest C. Harmon
his Attorney

Patented Jan. 7, 1936

2,027,348

UNITED STATES PATENT OFFICE 2,027,348

SIGHTING CONTROL FOR AIRCRAFT

Alexander Procofieff-Seversky, New York, N. Y., assignor to Seversky Aero Corporation Application April 10, 1922, Serial No. 551,191
Renewed October 6, 1934

63 Claims. (Cl. 33—46.5)

This invention relates to sighting and directive means for use with aircraft, and applicable as for bombing, navigation, aerial photography, and other purposes, and the present application is a continuation in part of my earlier abandoned application Serial No. 455,585 filed March 25, 1921 but explaining in greater detail the principles underlying my improvements as established in said earlier application.

One of the principal objects of my invention is to provide a sighting means which may be continuously trained steadily and easily upon the target, and to transmit and register automatically all movements imparted thereto by the observer, as a result of changes in position or behavior of the aircraft, and relative motion of the aircraft and the target.

In the usual known types of bomb sights it is necessary that great precision of observation and considerable calculation and reference to complicated charts be made. The use of said devices requires the efforts of experts for their manipulation, generally under the adverse conditions of heavy anti-aircraft fire which is disconcerting to the mental equipment of even the most experienced. Again, in view of the speed of aircraft the element of time is detrimental to the value of such computations.

It is therefore an object of my invention to provide a system of sighting which dispenses with charts and involves no calculations, but depends solely upon visual observation and concurrent, manual control of the sight.

Another object of my invention is to provide a simple apparatus for accurately taking into account and correcting the errors which arise from the drift due to cross winds, or to the speed of the target, if the target is moving.

Another object of my invention is to provide a directive means for the pilot which enables him to guide the aircraft along any desired course in relation to the target, without his being influenced by the conduct of the aircraft.

It is a further object of my invention to provide a bomb release timing mechanism which functions automatically from a predetermined setting.

It is an object of my invention to provide a sighting system in which the corrections due to variations of the line of sight in angle from the vertical are registered with reference to a true vertical determined by pendulum, gyroscope, or other means, said pendulum, gyroscope or other means being independent of the observer's sight and being incorporated directly with the dial or indicator of the indicating means or being operatively connected with said dial or indicator from a master pendulum, gyroscope, or other device maintaining a true vertical.

It is a further object of my invention to provide a sighting system in which it will be unnecessary to compute air speed or ground speed but to govern bomb dropping solely by the rate of angular change of the sight setting from the true vertical.

Other features and advantages of my invention will hereinafter appear.

In the example of my invention illustrated herein it is shown as designed primarily for use with aircraft of the larger type where the personnel manning the ship includes a pilot, an observer and a bombardier, though it is capable of embodiment for use in a two-place plane. Obviously the duty of the observer is to keep the sighting means trained steadily upon the target; the problem of the pilot is to approach the target at the proper angle in a horizontal plane; and the problem of the bombardier is to determine the angle of the target from a vertical plane and, by timing the rate of change of this vertical angle, to determine the proper time for the release of the bombs. The usual problem of the observer is to make such observations and computations as to drift, altitude, air and ground speeds as are necessary for him to deduce the proper directions for the pilot and himself.

In my sighting system the problems of the pilot and observer are greatly simplified and require only the minimum of thought and experience. The pilot merely has to keep the zero mark on a dial in coincidence with a pointer which is governed by other instruments included in my system, observing of course the usual rules of maintaining constant speed and approximately constant altitude. The bombardier does not have to observe any object on the ground and he may devote his whole time to the observance of the instruments before him without the usual mental disturbance caused by anti-aircraft fire.

Figure 1:
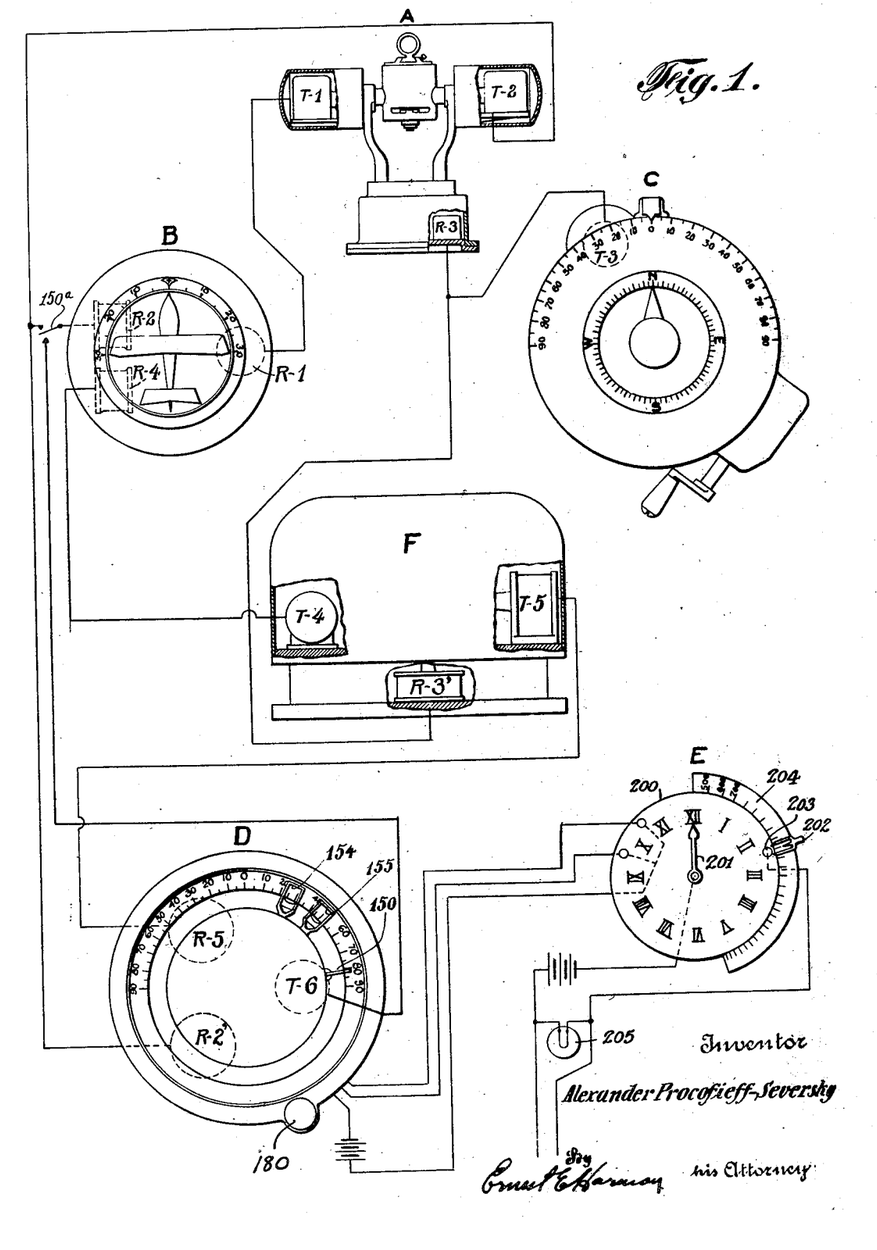
Figure 1 is a diagrammatic view of the assembly of my sighting system.

Referring particularly to the drawings: In Fig. 1, A is my sight-cradle for use by the observer; B is my pilot's director for use by the pilot; C is my drift indicator; D my depression angle indicator, which registers the complement of the depression angle; E the timing device, all for use by the bombardier; and F is my stable base, established by a gyroscope, pendulum or other means, to which all vertical angles are referred and which makes automatic corrections to the observed angles, such corrections being rendered necessary by the rising, pitching, rolling or dipping of the aircraft.

The lines connecting the various instruments show the manner in which they interact and it will be understood that such interaction may be brought about by mechanical, electrical or other means. I have illustrated electric transmission of action and have indicated the originating device for an electric impulse in each case as T and the receiving and repeating device in each case as R. I shall allude to the former hereafter as the "transmitter" and to the latter as the "repeater". I do not consider that it is necessary to give a detailed description of a transmitter and repeater since various types of apparatus of this nature are known, for example in connection with naval fire control.

I shall now proceed to a description of the functions of the various instruments, explaining the operation of each in detail subsequently.

The observer is required, as stated above, to keep the telescope pointing constantly at the target and, since the base of the sight-cradle is fastened rigidly to the body of the aircraft, the line of sight will be continually changing its relation to the longitudinal and vertical axes of the craft. Lateral movement of the line of sight will be caused by deviation from the true course, whether accidental or to correct drift, by rolling, by pitching, or by movement of the target. The angle made by the line of sight with the vertical is also changing by reason of the approach to, or recession from, the target, by varying elevation of the craft, by longitudinal pitching of the craft, and by rolling, except when the ship is on a level keel pointing directly to a target on the horizon. While the changes introduced by rolling are very small and could practically be neglected, yet my system takes them into account and compensates for them as will be hereinafter shown.

From the above it is obvious that as the craft moves in its course lateral deviations of the line of sight and deviations in the vertical plane are continually taking place under the influence of several factors.

Figure 2:
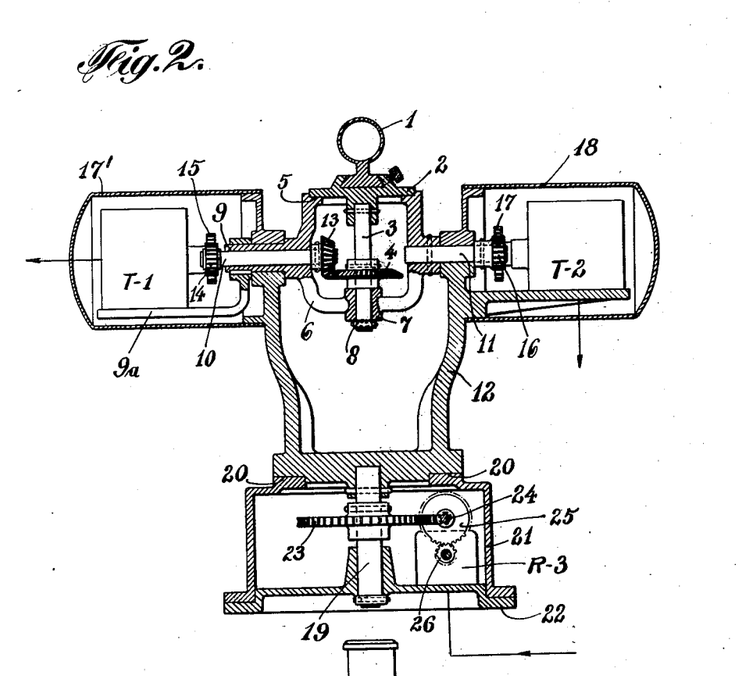
Fig. 2 is a cross-section through the sight-cradle showing the sighting telescope or other similar device, the method of its support and means for transmitting its lateral and vertical motions.

Now, referring to Fig. 1, all movements of the line of sight laterally, made by the observer in keeping his telescope trained on the target, will actuate transmitter T—1 and all movements at right angles thereto will actuate transmitter T—2, as shown in Fig. 2. Transmitter T—1 has a repeater R—1 in the pilot's director, B, and this repeater R—1 acts directly upon the pilot's director mechanism. Transmitter T—2 has a repeater, R—2 also acting directly upon the pilot's director mechanism, and a second repeater R—2', at the depression angle indicator D.

Allowance is made for drift by manual adjustment of the drift indicator, C, to steady zero reading with the magnetic needle. It will be understood that if the drift indicator is not set correctly to indicate the drift, the craft will travel in a curve and the line of sight to the target will change direction as compared with the magnetic needle, but when the drift indicator is set correctly to indicate the drift the angle between the line of sight to the target and the magnetic needle will remain constant. Transmitter T—3, at the indicator transmits to repeater R—3, at the sight-cradle A and turns the cradle through the correct angle to allow for the drift. It is necessary also to align the longitudinal axis of the stable base, F, with the true course toward the target since all vertical angles are to be measured in a vertical plane of which the course is the horizontal projection or trace. This is accomplished by repeater R—3'.

The stable base, F, corrects for errors due to rolling, through transmitter T—4, to repeater R—4 at the pilot's director B, and for errors due to changing elevation or pitching, through transmitter T—5 to repeater R—5 at the depression angle indicator, D. Repeater R—5 is arranged to modify the original depression angle registered and the corrected result may be transmitted from transmitter T—6 to repeater R—2 at the pilot's director, B, when desired.

It is now evident that all observations and corrections have been integrated to the three repeaters at the pilot's director, B, and their final integration at that point furnishes a true indication for the pointer or needle.

The timing mechanism is independent of, and supplementary to, the above system for navigating the craft over the target, and I now propose to describe each of the navigating instruments in detail.

*Sight-cradle.*—Referring to Fig. 2, 1 is the sight, telescopic or otherwise, rigidly fastened to a revolving cap or plate 2, which in turn is rigidly connected with a vertical shaft 3, supplied with a bevel gear 4, fast thereto. The revolving plate 2 rests on a circular shoulder 5, in a frame or yoke 6, and the lower end of shaft 3 projects through a bearing 7 in the lower part of frame 6 and is held in place by a nut or other fastening 8. Frame 6 is extended on one side to form a bushing 9 and is provided with two horizontal shafts, 10 and 11, which are seated respectively in the bushing 9 and in a bearing on one side of a cradle 12, bushing 9 being similarly seated in a corresponding bearing on the opposite side of cradle 12. Shaft 10 has a bevel gear 13 at one end engaging bevel gear 4, and a pinion 14 at the other end engaged with a gear 15 on transmitter T—1 and is free to turn within the bushing 9. Shaft 11 is rigidly fastened to frame 6 at one end and is provided with a pinion 16 at the other end, engaging with gear 17 on transmitter T—2. 17' and 18 are suitable covers to protect transmitters T—1 and T—2 respectively. Transmitter T—1 is carried by a bracket 9a which is rigid with the bushing 9.

The cradle 12 has a vertical shaft 19, to which it is rigidly fastened, and is revoluble upon a raised annulus 20, of upper base 21, which in turn is integral with, or fastened to, lower base 22. Shaft 19 has a rigidly attached gear 23, meshed with a worm 24, whose shaft also carries a gear 25, which is in mesh engagement with pinion 26, on repeater R—3.

Figure 3:
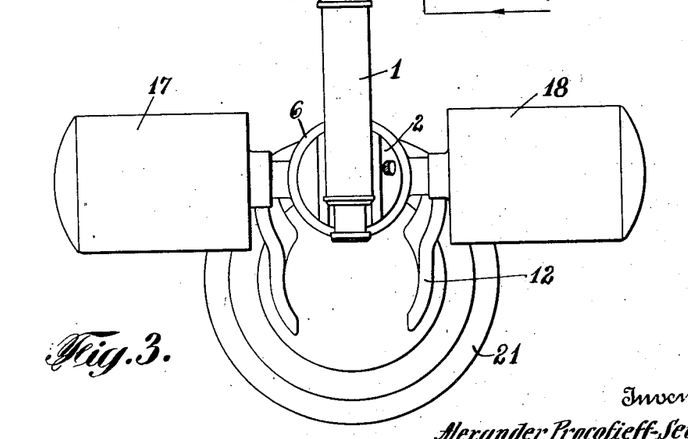
Fig. 3 is a plan view of the sight-cradle.

Fig. 3 shows the relationship in plan of the various parts described above for Fig. 2, and it is to be noted that I may prefer to provide suitable openings in the bottom of cradle 12, upper base 21 and lower base 22, or to offset the upper part of sight cradle 12 so as to permit a clear line of sight below or toward the rear of the air-craft.

It is now obvious that revolution of sight 1 about its axis passing through shaft 3, that is, lateral movement of the line of sight, will operate through bevel gears 4 and 13, pinion 14 and gear 15 to actuate transmitter T—1; revolution at right angles to this will similarly operate through shaft 11, pinion 16 and gear 17 to actuate transmitter T—2, shaft 10 remaining motionless by reason of being mounted in bushing 9. I may arrange transmitter T—2 so that it reverses when the line of sight passes the vertical or at any other desired point in its revolution. Repeater R—3 operates through pinion 26, gear 25, worm 24 and gear 23 to turn sight cradle 12 through any desired angle in relation to subbase 21 and lower base 22; and any other motion of this train, as a result of moving the sight, is prevented by the worm gearing.

Figure 4:
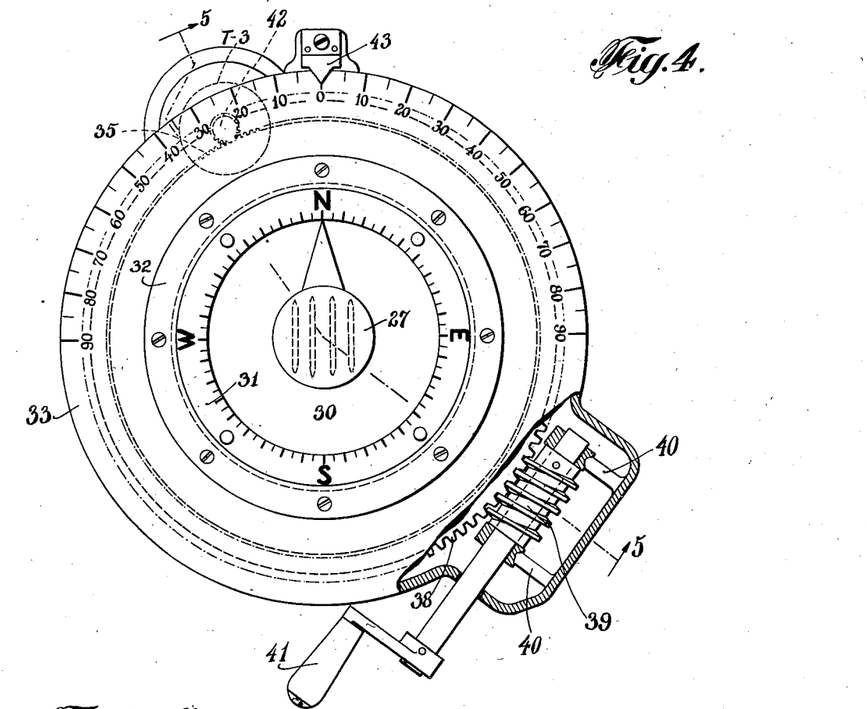
Fig. 4 is a plan view of my drift indicator.
Figure 5:
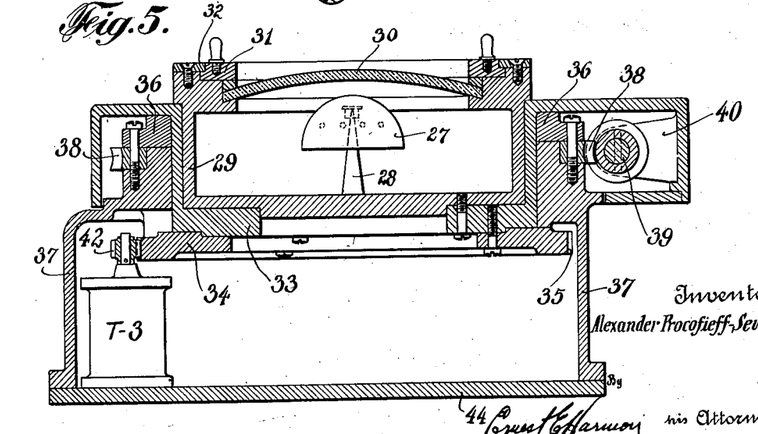
Fig. 5 is a central section of the same on the line 5—5 of Fig. 4.

*Drift indicator.*—Referring to Fig. 4 and Fig. 5 which are a plan view and central section respectively of my drift indicator, 27 is a compass needle and 28 is its pivot. The compass box 29 is provided with a glass cover 30, a graduated ring 31, capable of revolution between the box 29 and the annular guide 32, and is rigidly fastened to a revolving frame 33, which in turn is rigidly fastened to a secondary frame 34 having gear teeth 35 on its outer periphery. Frame 33 turns upon an annulus 36 fastened to the upper portion of base 37 and is designed to cover ring gear 38, which is also fastened to base 37, and worm 39, which revolves in bearings in brackets 40 on the inner side of the extension of frame 33. Worm 39 is provided with a crank handle 41. The gear teeth 35 on secondary frame 34 mesh with pinion 42 on transmitter T—3. The upper surface of the periphery of frame 33 is graduated as shown, and pointer 43 which is fastened to base 37 is adapted to give readings on this graduation. Base 37 is provided with a base plate 44 which carries the whole instrument, and is normally attached to the body of the aircraft. The manner in which this drift indicator works will now be explained.

Assuming that there were no drift of the air-craft due to cross winds the compass needle 27 would give a reading on the ring 31 dependent upon the course of the craft, and would hold this reading as with the ordinary navigating compass; all that the observer would then have to do would be to turn ring 31 to a position in which the north point on the ring was opposite the point of the needle, and so long as the craft maintained its course the needle would point to the N on the ring. As soon as drift became evident the craft would begin to move sideways from its true course, and then the efforts of the observer and pilot to steer the craft toward the target would result in a changing direction, or course. Under this condition the needle would immediately move over to one side or the other of the point N. Thereupon the bombardier would turn crank handle 41, thus revolving frame 33 until the two points were again in coincidence, and this operation would be continued until a true angle of drift had been established which could be read, if desired, from the graduation at pointer 43. This reading however, is unnecessary in the working of my system, since the revolution of frame 35 and pinion 42, and as will be seen later the action of transmitter T—3 is to set up permanent adjustment in the other instruments to compensate for the drift.

It will be understood that while I have illustrated and described a magnetic compass in connection with my drift indicator, any other form of compass or constant direction indicator may be equally well employed.

Figure 6:
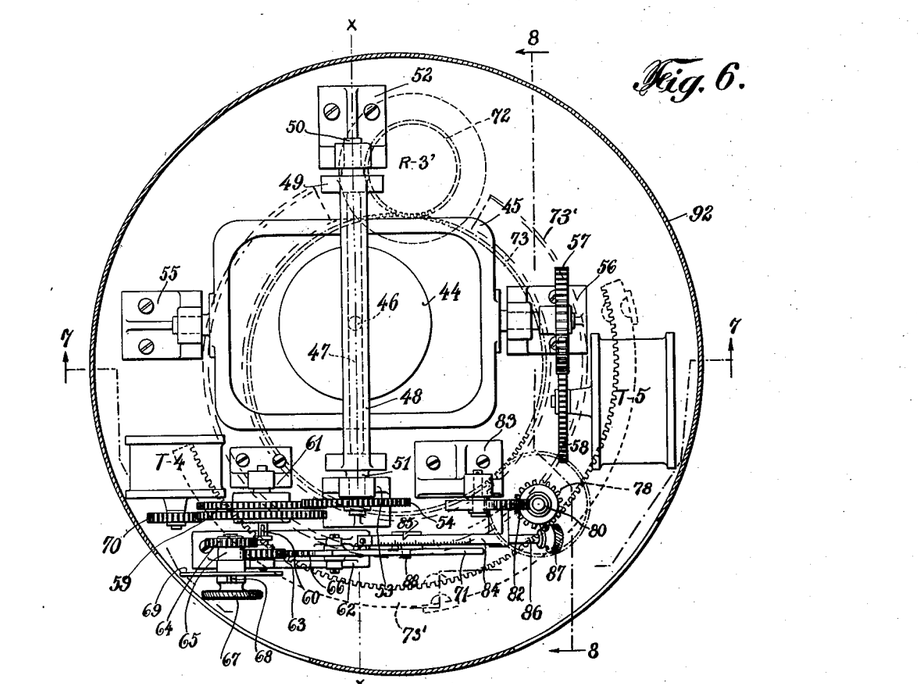
Fig. 6 is a plan view of my stable base, showing in this case a gyroscope and means for transmitting the relative movements of its axes.
Figure 7:
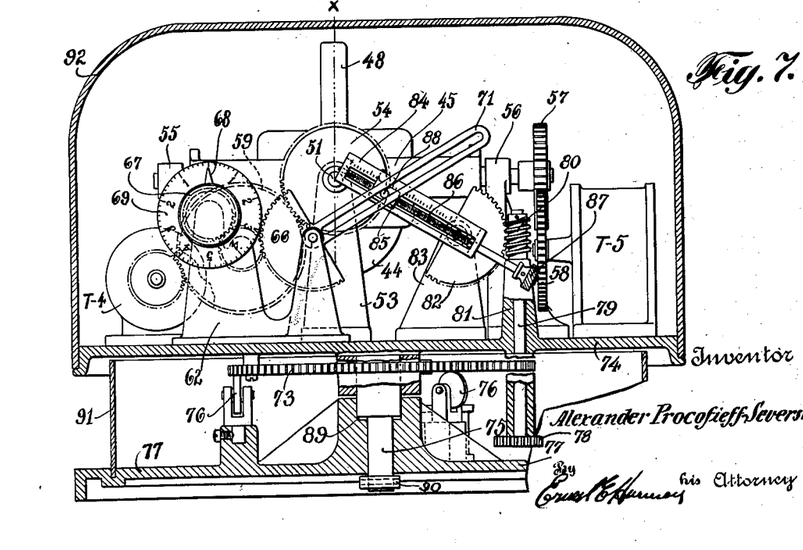
Fig. 7 is a sectional view of the same on the line 7—7 of Fig. 6.
Figure 8:
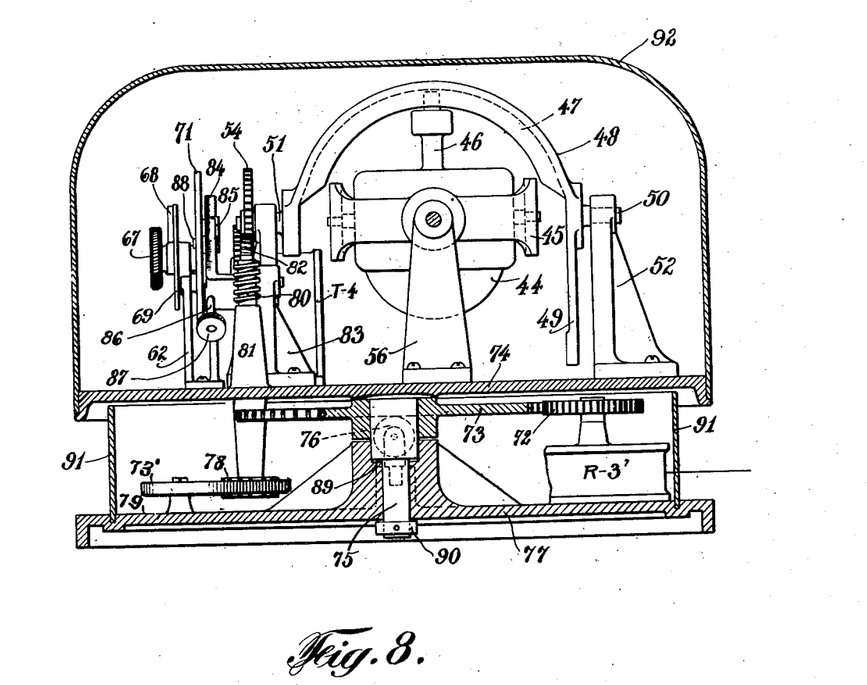
Fig. 8 is another sectional view on the line 8—8 of Fig. 6.

*Stable base.*—Fig. 6 is a plan view of a gyroscopic form of stable base which I employ for purposes of illustration. Fig. 7 is a section of the same along the line 7—7 on Fig. 6, and Fig. 8 is another section along the line 8—8 on Fig. 6. The gyroscope 44 is supported as usual in a gimbal ring or yoke 45 set normally at right angles to the longitudinal axis of the aircraft, and the upper end of its vertical axis 46 is operative in a semi-circular groove or channel 47 formed in a curved guide or yoke 48. The guide 48 is provided with a counter-poise 49 at one end, and with pivots 50 and 51 at opposite ends of the diameter of the semi-circle. Pivot 50 is supported in pedestal bearing 52; pivot 51 is supported in pedestal bearing 53, and is furnished with a rigidly attached gear 54. The pivots of the gimbal ring 45 are supported in bearings 55 and 56, and the pivot in bearing 56 is extended sufficiently to permit the rigid attachment thereto of a gear wheel 57. Gear 57 meshes with gear 58 on transmitter T—5. Gear 54 is in mesh engagement with one of a pair of differential gear wheels 59 which are carried on a shaft 60 supported by bearings 61 and 62. The gears 59 are loose on shaft 60 but connected to each other and to shaft 60 by a conventional differential gearing the planet carrier of which is secured to shaft 60 whereby rotation of either gear 59 will rotate shaft 60. A similar differential mechanism is shown at 97 in Fig. 11. One end of shaft 60 is slotted and furnished with a slidable gear 63 which is adapted to mesh with gear 64 at the end of shaft 65 or with the toothed sector 66 depending upon its position on shaft 60. The end of shaft 65 opposite the gear is provided with a milled head 67 and a fixed pointer 68, while behind the pointer is a graduated circular plate 69 fastened to bearing 62. Returning to the pair of differential gears 59 the one which is not in mesh with gear 54 is engaged with gear 70 of transmitter T—4. Sector 66 is pivoted in bearing 62, and is provided with a slotted arm 71. Referring now to repeater R—3', this is furnished with a gear 72 meshing with a large gear wheel 73 rigidly fastened to the table 74 of the stable base. Gear wheel 73 and table 74 are carried on a vertical shaft 75, and supported on frictionless idler wheels 76 which in turn are supported on the base 77. A gear 73' rigidly secured to the base 77 is in mesh engagement with gear 78 fastened to the lower end of vertical shaft 79 which is provided at its upper end with worm 80 and is supported on a bearing formed by an upward projection 81 of table 74. Worm 80 meshes with a toothed sector 82 pivoted on bearing 83, and provided with a slotted graduated arm 84. In the slotted arm 84 is a block 85 capable of movement up and down the slot by means of the threaded rod 86, which is provided with a milled head 87. The block 85 has on its one surface a pin 88 which engages the slot in arm 71. Vertical shaft 75 is supported by a shoulder 89 on a frictionless bearing in a boss in the center of base 77, and is prevented from receiving upward displacement by means of a nut 90 or other suitable fastening at its extreme lower end. The mechanism below table 74 is enclosed by a suitable cover 91, and that above table 74 by cover 92.

Having now described the construction of my stable base in detail, I will explain how it operates for correcting errors in sighting due to rolling or pitching of the craft. It will be noted that under action of repeater R—3' the revoluble portion of the stable base with its contained mechanism will be rotated by means of gears 72 and 73 into a position in which its longitudinal axis X—X is parallel with the vertical plane containing the line of sight. As soon as pitching of the aircraft commences in the line of sight it is evident that relative rotation of gears 57 and 58 will occur by reason of the spin axis of the gyroscope endeavoring to maintain its position. This relative rotation will immediately operate transmitter T—5, and through it, repeater R—5 in the calculator actuating the depression angle indicator. When rolling in a plane at right angles to the vertical plane containing the line of sight commences, vertical shaft 46, tending to maintain its upright position, will deflect curved guide 48, thereby setting gear 54 into rotation. The meshing of gear 54 with the first mentioned gear of the differential pair of gears 59 will set up a modified rotation in the second one of the pair due, of course, to the differential action, and this will be imposed upon gear 70 on transmitter T—4 which will communicate it to repeater R—4 in the pilot's director. Slotted arm 84 is an automatic adjusting device for taking care of the correction needed when there is a cross wind, and I will explain the need for this adjustment in my presentation of the governing principles following these detailed descriptions. When block 85 is brought to its proper position on the graduated scale for altitude and air speed, and, due to drift, gear 73' acts upon gear 78 and thus upon worm 80, which in its turn will cause rotation of toothed sector 82 with arm 84, pin 88 changes the angular relationship of arm 71 and toothed sector 66 to the differential gearing and thus modifies the action of transmitter T—4.

Considering the differential train of gears as a whole from 54 to 70 inclusive, with gear 63 and toothed sector 66, when movement of toothed sector 82 takes place, as just described, all of the gears are free to turn with the exception of gear 54 and its engaged gear of the differential pair 59, motion of these being restrained through resistance imposed by the gyroscope itself. This arrangement permits modification of the working of the transmitter T—4 without upsetting the operation of the gyroscope.

Under certain circumstances which will be described later it is desirable to control the operation of transmitter T—4 by manual correction through milled head 67 rather than by the automatic means just described; in this case gear 63 is shifted on shaft 60 so that it meshes with gear 64 instead of with the toothed sector 66.

Figures 9, 10, 11:
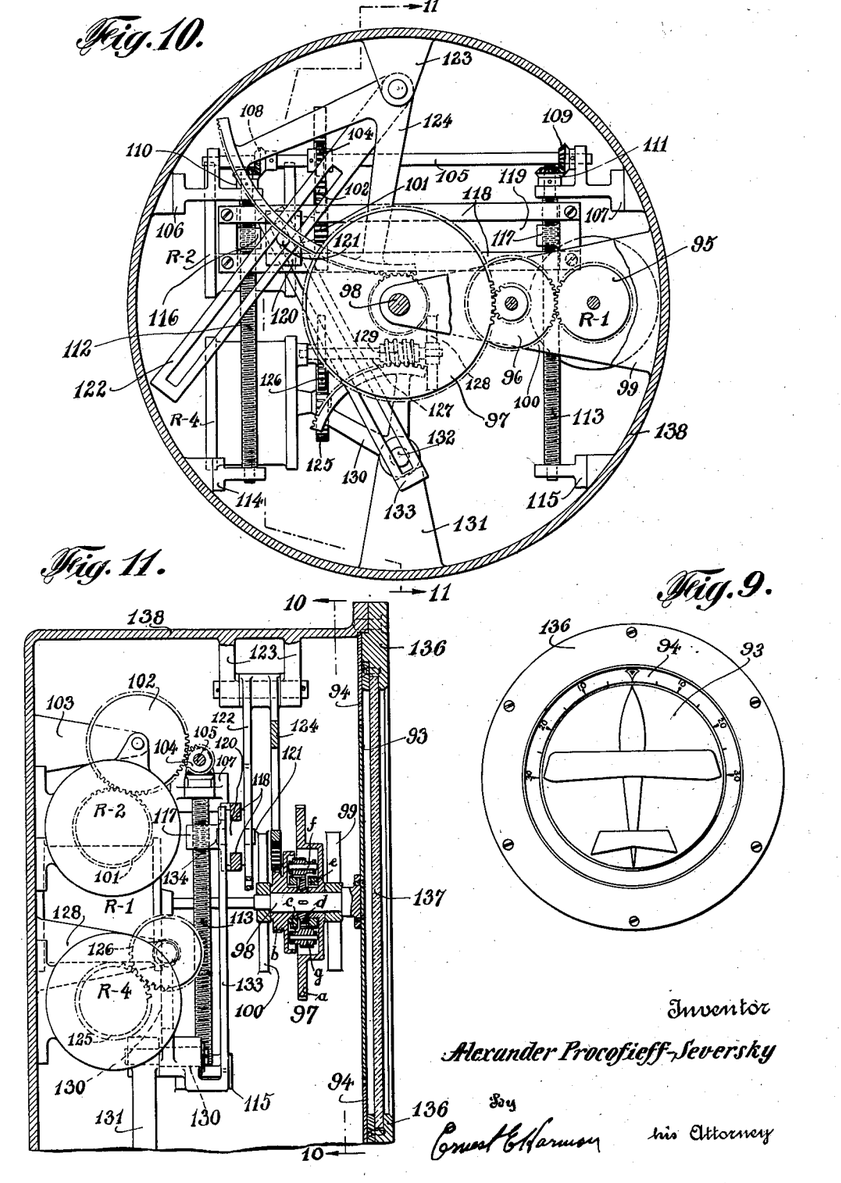
Fig. 9 is a plan view of my pilot's director, showing the indicating pointer and its graduated scale.
Fig. 10 is an interior plan view of the same on the line 10—10 of Fig. 11 showing the controlling mechanism for the pointer.
Fig. 11 is a sectional view on the line 11—11 of Fig. 10.

*Pilot's director.*—The top plan view of my pilot's director is given in Fig. 9, which shows the moving disc 93 and graduated ring 94, disc 93 being provided with suitable indicating means, in the case illustrated this means being the outline of an airplane. It will be noted that while I have shown a disc suitably marked, any form of pointer may be equally well employed to obtain a reading on the graduated ring 94. An interior plan view of my pilot's director is shown in Fig. 10, and a sectional view on the line 11—11 of Fig. 10 in Fig. 11; line 10—10 on Fig. 11 indicates the level of plan, Fig. 10. Repeater R—1, which it will be recalled is controlled by transmitter T—1 at the sight cradle, operated in turn by lateral movements of the sight, has a gear 95 which meshes with gear and pinion 96 between brackets 99 and 100. The pinion 96 is in mesh engagement with element a of differential gearing 97. Gearing 97 is composed of elements a, b, c, d, e, f, and g and is carried on shaft 98 which is supported by brackets 99 and 100.

Repeater R—2 is furnished with a gear 101 meshing with gear 102 which is pivoted and supported in a bearing on pedestal 103. Gear 102 meshes with gear 104 that is rigidly fastened to shaft 105. Shaft 105 is supported in bearings on brackets 106 and 107 and has bevel gears 108 and 109 keyed to or made integral with it. These bevel gears 108 and 109 engage with bevel gears 110 and 111 respectively which are fastened to or integral with one end each of the threaded spindles 112 and 113 respectively. Spindles 112 and 113 are supported at the same end in bearings in brackets 106 and 107, and at the opposite end in bearings in brackets 114 and 115. These spindles engage threaded projections 116 and 117 at opposite ends of a travelling bridge 118 which has a central slot 119. In slot 119 travels a block 120 provided with a pin 121 on its upper surface. Pin 121 engages a slot in arm 122 which is pivoted in bracket 123 and which is made integral with or rigidly fastened to a toothed sector 124. Toothed sector 124 meshes with element b of differential gearing 97.

Repeater R—4 is provided with a gear 125 meshing with gear 126 which is integral with or keyed to shaft 127. This shaft is supported in a bearing at one end formed on the casing of repeater R—4, and in a bearing at the other end in pedestal 128, and is provided with a worm gear 129 which meshes with a toothed sector 130 pivoted on bracket 131 by pin 132. Fastened to or integral with toothed sector 130 is a slotted arm 133, the other end of which engages a pin 134 on the lower side of block 120, and directly opposite to pin 121 on the upper side thereof. Shaft 98 is extended above bracket 99 to form a support for the rotating dial or pointer 93. The graduated ring 94 is fastened to the under side of a cover 136 provided with a sight glass 137.

The whole of the mechanism is contained in and supported upon the body 138.

The pilot's director is an integrating mechanism for all horizontal components of angular movement of the line of sight. Repeater R—1 receives impulses from transmitter T—1 corresponding to the full lateral angular movement of the sight but as this angular movement is almost always increased by rolling of the craft, certain corrections are required before its effect can be allowed to influence the dial plate or pointer. It is obvious that the angle made by the line of sight with the horizontal, that is, the angle of depression, will affect the resultant value with any given amount of roll, and that the correction to be made will be a function of the tangents of both the angle of depression and the angle of roll. Repeater R—2 is therefore introduced to provide for the depression angle, and, as shown in Fig. 1, it may be actuated directly by transmitter T—2 or through the depression angle indicator and transmitter T—6, as desired, but both controls cannot be exercised simultaneously. A switch 150a, Figure 1, is provided for changing the connection. Repeater 9—4 provides the factor for the angle of roll, it being remembered that the stable base always has its axes parallel and perpendicular to the line of flight, and hence transmits the true amount of roll measured at right angles to the line of flight.

The problem, therefore, is to combine the two tangential functions and to apply their resultant to differential gearing 97. Now, referring to Fig. 10, travelling bridge 118 is actuated directly by reepater R—2 and, when the line of sight is horizontal, its center and block 120 will be directly over pin 132 and arm 122 will lie on the line joining the centers of pin 132 and the pivot in bracket 123. Impulses transmitted through repeater R—4 therefore, as a result of rolling, will cause toothed sector 130 and slotted arm 133 to swing without affecting the differential gearing 97. As the line of sight descends below the horizontal, travelling bridge 118 will be moved by repeater R—2 towards the further ends of threaded spindles 112 and 113, and in its 90° position, that is, with the line of sight vertical, will reach a point midway between the centers of pin 132 and pivot in bracket 123, but it will be noted that the total travel possible will permit correction for angles somewhat greater than 90°. When observation is performed through the vertical in the negative direction, as stated in the description of the sight-cradle, transmitter T—2 will reverse and hence travelling bridge 118 will move back towards its initial position.

When the line of sight is vertical the influence of rolling will be at its maximum and the deviation on each side of the line of sight will be the tangent of the angle of roll times the altitude. For any intermediate depression of the line of sight the deviation will be proportionate to the cotangent of the angle of depression as well as to the tangent of the angle of roll, and my mechanism is arranged to reproduce the ratios of these tangential values automatically. While I have illustrated the combination of travelling bridge 118 and slotted arms 122 and 133 to accomplish this purpose it is obvious that other forms or arrangements of mechanism may be employed for the same purpose and I do not wish to restrict my invention to the precise type illustrated.

Figures 12, 13, 14, 15, 16:
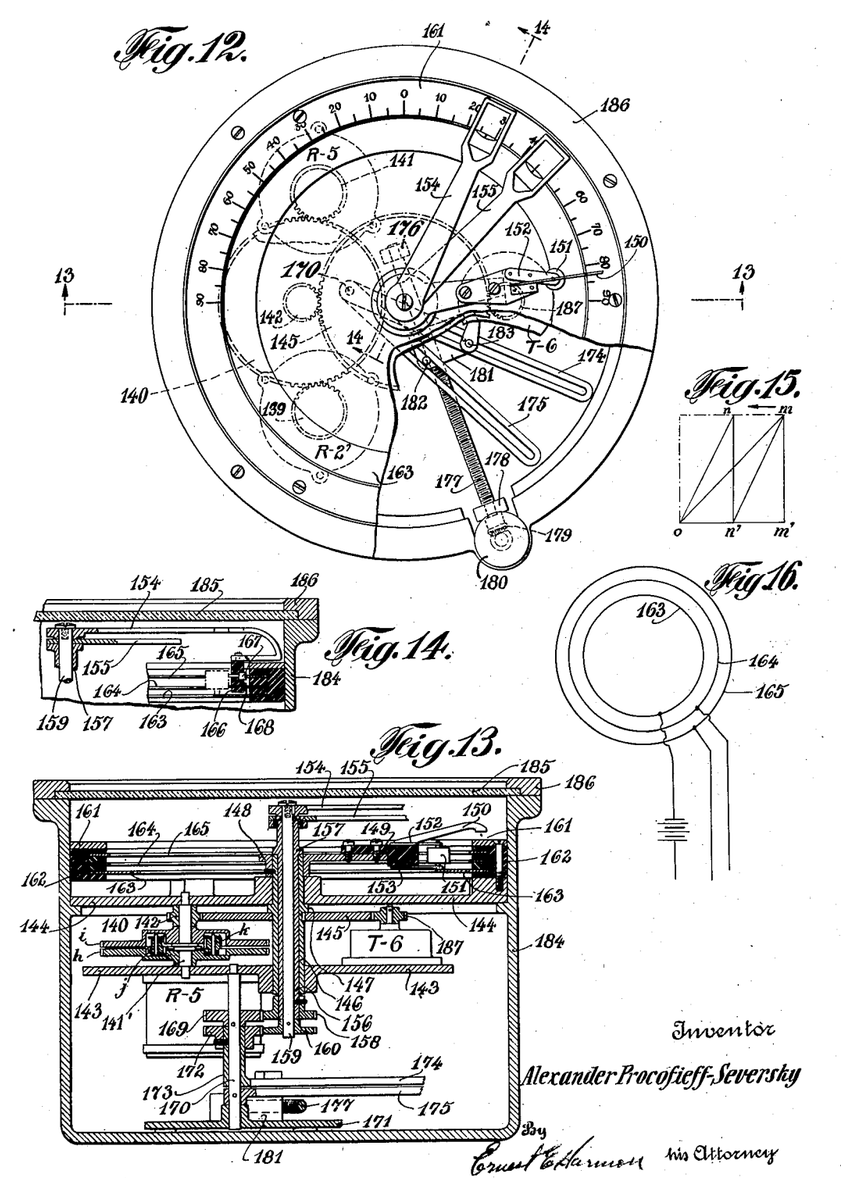
Fig. 12 is a plan view of my depression angle indicator, showing its pointer, graduated scale, and contact arms.
Fig. 13 is a central section of the same on the line 13—13 of Fig. 12 showing the mechanism controlling the pointer and mechanism for setting the arms.
Fig. 14 is a sectional view on the line 14—14 of Fig. 12 showing how electric contact is made between arms and pointer.
Fig. 15 is a diagram indicating the principle governing my timing mechanism.
Fig. 16 is a diagram of the electric circuits in my depression angle indicator and its outside connections.

*Depression angle indicator.*—A plan view of my depression angle indicator is shown in Fig. 12, and a central section upon the line 13—13 of Fig. 12 is given in Fig. 13, and a partial section showing one of the contact arms is given in Fig. 14. Referring to Fig. 12; repeater R—2' has a gear 139 meshing with element $h$ of differential gearing 140, and repeater R—5 has a similar gear 141 meshing with element $i$ of differential gearing 140, which also has elements $j$ and $k$. Differential gearing 140 is carried on shaft 141' to which is fastened gear 142. Shaft 141' has a lower bearing in plate or bracket 143, and an upper bearing in plate 144. Gear 142 meshes with gear 145 which is keyed to bushing 146. Bushing 146 has a lower bearing in plate or bracket 143, and an upper bearing in plate 144, and is prevented from receiving upward displacement by collar 147, and from receiving downward displacement by the hub of the pointer arm 148 which is fastened to it. At the end of pointer arm 148 is fastened a block of ebonite or other suitable insulating material 149 to which is fixed pointer 150, and also contact roller 151 by means of strips 152 and 153. The contact arms 154 and 155 revolve on a common axis, contact arm 155 being fastened to a bushing 156 which revolves inside bushing 146, and is supported by a collar 157 revolving on the upper end of bushing 146. It is provided with a gear 158 fastened to its lower end or made integral therewith. Contact arm 154 is fastened to the upper end of shaft 159 which revolves inside bushing 156, and to the lower end of which is fastened gear 160. It will be noted that ends of the contact arms 154 and 155, as shown in Fig. 14, are shaped so that they will clear the end of pointer 150, which is therefore free to revolve around the graduated ring 161 without interference with them. Below graduated ring 161 is an ebonite ring or ring made of other suitable insulating material 162, fastened to plate 144. Spaced within this ring is a continuous contact ring 163, and two contact rings 164 and 165, and the ends of contact arms 154 and 155 are provided with insulating blocks 166 carrying contacts 167 and 168, and adapted to travel around contact rings 165 and 164 respectively. Gear 158 meshes with gear 169 which is keyed to shaft 170 revolving in a bearing at the upper end in plate or bracket 143, and in a bearing at the lower end in plate 171. Gear 160 meshes with gear 172 which is fastened to bushing 173, which in turn is integral with slotted arm 174. Slotted arm 175 is keyed to the lower end of shaft 170. Plate 171 carries a small bearing 176 in which turns one end of threaded spindle 177. The other end of threaded spindle 177 turns in bearing 178 and is provided with a bevel gear 179. Gear 179 meshes with a bevel gear on milled head 180. Travelling on threaded spindle 177 is a block 181 with a pin 182 operating in the slot of slotted arm 175, and another pin 183 operating in the slot of slotted arm 174. The entire mechanism is enclosed in a body or case 184, and is provided with a sight glass 185 held in place by an annulus 186. In addition to meshing with gear 142 gear 145 is in mesh engagement with gear 187 of transmitter T—6.

The function of the depression angle indicator is to integrate the vertical movements of the line of sight. As already seen transmitter T—2 responds to these movements at the sight cradle, and its impulses are received by repeater R—2' at the depression angle indicator, and are communicated through gear 139 to element $i$ of differential gearing 140. In similar manner changes in vertical angle due to pitching, climbing or descending actuate transmitter T—5 at the stable base, and hence repeater R—5 at the depression angle indicator. Repeater R—5 conveys impulses through gear 141 to element h of differential gearing 140, thus adding to or subtracting from the reading which would be indicated by repeater R—2', as may be necessary. The integrated resultant from differential gearing 140 is passed on to gear 145 and pointer 150 is thus turned to the proper reading. It will be noted that as gear 145 turns it operates gear 187 on transmitter T—6 which is therefore always set for the true depression angle.

*Timing device.*—When dropping a bomb upon a target it is necessary to release the bomb before reaching the point directly over the target. It is desirable therefore to provide means which will indicate the rate of approach to a point directly above the target and preferably also to provide means which can be set in accordance with the altitude and speed of flight to release the bomb automatically or to indicate the time of manual release at such point that the bomb will reach the target. This setting may be said to depend upon the range angle which is of course a function of the altitude, speed and other modifying factors. In the arrangement shown, a timing device is provided comprising a hand 201 which is started automatically by contact of roller 151 with contact 168 when the plane reaches a point where the angle of depression of the telescope corresponds with a certain predetermined angle and the timing mechanism is reversed by contact of roller 151 with contact 167 when the angle of depression of the sighting telescope corresponds to the angle whose tangent is one half the tangent of the first mentioned angle. By this arrangement, the moving hand of the timing device will approach the zero point as the craft, continuing its flight, approaches the point directly above the target. It will be noted that by this arrangement, the moving hand 201 continues to approach a predetermined observable point at a rate of speed such that said point will be reached by the hand as the craft reaches a point directly over the target.

In the arrangement indicated in Figure 1, an adjustable indicator 202 carrying an electrical contact 203 is adjustable around a graduated scale 204 so arranged that as the hand 201 passes the same in its movement toward the zero point after reversal of the timing mechanism, an electrical circuit will be closed to light a signal lamp 205 or to cause release of the bomb, or both. In the arrangement illustrated in the drawings, the scale along which the adjustable indicator moves is conventionally indicated as graduated in accordance with altitudes, it being assumed that the range angle for the various indicated altitudes has been calculated for the speed of the particular craft and the points suitably worked out with relation to the speed of movement of the timing mechanism hand 201.

It is to be noted that by this arrangement it is not essential that the telescope should continue in use after the reversal of the timing device. The bomb therefore could be dropped accurately even though a smoke screen or cloud should obscure the target at the exact moment when the bomb should be dropped.

*Bomb sighting.*—The primary reason for obtaining the true reading of the depression angle is in connection with bomb sighting, photography, or other similar work, since I have devised a method of dropping a bomb upon a target which relies solely upon observation of angles in the vertical plane or in an artificially inclined plane. If we assume that an aircraft is travelling in the direction of the arrow in Fig. 15, and that the target is located at o, at any given instant the craft may be considered to be at the point m directly above the point m' on the ground. When the craft has moved half way towards the target it will be at the point n directly above the point n' on the ground and, from the diagram, it is obvious that, for a constant altitude mm' or nn', the tangent of the complement of the angle of depression mom' will be just double the tangent of the complement of the angle of depression non'. If therefore, the value of the tangent of the initial complement of the angle of depression is ascertained and the value of the new complement of the angle of depression corresponding to half this tangent is found it will be known by observation of the complement of the angle of depression when the aircraft has reached the point n. In applying this principle to bomb sighting I observe upon the target at a convenient angle of depression and start the timing device, permitting it to operate until the second angle of depression appears on the depression angle indicator; at this point the timing device is reversed and by the time its pointer has returned to zero the craft will be directly over the target. In practice it is necessary to allow for the forward velocity imparted to the bomb by the motion of the craft and the release of the bomb is therefore made at an appropriate interval slightly before the pointer has reached the zero. The values for the tangents for the various angles can of course be taken from tables of tangents, but I have devised the automatic means shown in Figs. 12 and 13 to give me the proper relative setting of the two contact arms 154 and 155, this being done by milled head 180, threaded spindle 177, block 181, and the two slotted arms 174 and 175. The arrangement of the mechanism is such that no matter at what angle contact arm 155 may be placed the corresponding setting of contact arm 154 will be at an angle whose tangent is one-half the value of the tangent shown by contact arm 155. It is now obvious from the drawings that when the craft is approaching the target the contact arms may be moved into their desirable positions, and that as the depression angle increases contact roller 151 will first make contact with 168 on contact arm 155, thus closing a circuit through ring 164, roller 151, and continuous contact ring 163, and setting the timing device into motion. As the depression angle still further increases the same operation will take place with contact 167 on contact arm 154 whereby the operation of the timing device will be reversed. Fig. 16 is a diagrammatic representation of the electrical connections to the continuous contact ring 163 and to the secondary rings 164 and 165.

In my description of the operation of the stable base I mentioned slotted arm 84 as an automatic adjusting device for obtaining the necessary correction when navigating in a cross wind. When bomb dropping is performed with a cross wind the craft must move on a parallel course to windward of the true course a sufficient amount to allow for the drift of the bomb itself, after it is released from the aircraft. This can be achieved by establishing a plane of sight artificially inclined in the lateral direction in such a manner that the inclination is not apparent to either observer or pilot. This I achieve through rotation of gear 73, (see Fig. 7) as a result of the action of repeater R—3', which it will be remembered operates in harmony with transmitter T—3 at the drift indicator. Revolution of gear 73 causes corresponding rotation of gear 78, hence of worm 80 and toothed sector 82 with its integral arm 84; this affects the differential train and the impulse is forwarded by transmitter T—4, embodying the correction needed to place the craft on the desired parallel course. Since it is obvious that the offset from the true course will depend on the varying factors of air speed of the craft, altitude, and type of bomb, I provide graduation of slotted arm 84 to meet the particular requirements for each instance. Now, in photography or aerial mapping work it is frequently desirable to fly on a series of parallel courses, and, under these circumstances, the automatic control would be discarded and the necessary changes in the differential train be caused by manual revolution of dial 69 operating through gear 64 and gear 63 in its shifted position.

The theory of operation for flying in a straight line sufficiently upwind from the target position to allow for the drift of the bomb with the wind, while falling or for flying in parallel lines for map photography while observing one fixed target as a guide involves establishing a plane thru the desired line of flight and the target. For bomb dropping this plane should be inclined more or less depending upon the lateral component of the wind, the altitude, the time of falling of the bomb as affected by the characteristics of the bomb (its terminal velocity).

No element of the apparatus shows the angle of this theoretical inclined, nearly vertical, plane but nevertheless such a plane is in fact established and flight is maintained in that plane end, by use of a usual altimeter, at the desired elevation.

The mechanism chiefly effective consists of the stable base and associated mechanism. Normally the stable base establishes a true vertical and therefore jointly with the line of flight as indicated by the position of the sight cradle and sight establishes a vertical plane including the line of flight and a point vertically below the craft. Since the point below and the target lie in a line parallel to the line of flight this plane includes the line of flight and the target, or we may properly say the apparatus establishes a plane of reference thru the target and the line of flight. In fact this plane of reference must be inclined to the true vertical to bring the line of flight upwind from the target. This is accomplished by causing the indications transmitted from modification by adjustments within the stable base whereby not a true vertical but an inclined reference line is established though not exactly indicated by any single part of the mechanism. This mechanism is shown in Figs. 6, 7 and 8 and hereinbefore described. The greater the angle of drift, for example, the greater is the lateral drift during falling, the greater the inclination of the nearly vertical reference line and the plane established by this line and the line of flight. Correspondingly the greater is the turning of the stable base by the repeater R3' with its effect thru arms 71 and 84 Fig. 7.

Similarly for photographic work a laterally inclined plane can be arranged by manual adjustment through knurled head 67 Figs. 6 and 7.

An example will illustrate the operation. If flying with no drift arms 84 and 71 will coincide or rest in zero position and and transmitter T—4 will transmit only the lateral movement of the stable base relative to the craft. This operation establishes in effect a vertical line and this line and the line of flight establish a vertical plane of reference. When drifting 30° arm 84 will lie at an angle and will influence the transmissions of transmitter T—4 whereby in effect an artificial line of reference not quite vertical will be established. If, therefore, the plane is horizontal and the gyroscope is plumb the reading transmitted by T—4 is not of synchronism with the gyroscope sufficiently to cause an inclined line and an inclined plane to be established as is necessary to correct for drift of the bomb in falling.

Variations within the spirit and scope of my invention are equally comprehended by the foregoing disclosure.

I claim:

1. A sighting system for use with aircraft including a sight, a support therefor on which the sight is capable of universal movement, a direction indicator separate from the sight, means for communicating relative motion between the sight and its support to the direction indicator, a drift angle indicator and means for communicating the angle of drift from the drift indicator to the sight support.

2. A sighting system for use with aircraft, including a sight, a support therefor on which the sight is capable of universal movement, a depression angle indicator, means for communicating relative motion between the sight and its support to the depression angle indicator and means for correcting the indication of the depression angle indicator for pitch of the craft.

3. A sighting system for use with aircraft, including a sight, a support therefor on which the sight is capable of universal movement, a direction indicator, a depression angle indicator, and means for communicating relative motion between the sight and its support to the direction indicator and the depression indicator including means for communicating variations of the depression angle to the direction indicator.

4. A sighting system for use with aircraft, including a sight, a support therefor on which the sight is capable of universal movement, a direction indicator, a depression angle indicator, a drift angle indicator, a revoluble stable base, means controlled by the drift angle indicator to rotate the stable base an amount equal to the angle of drift, means controlled by the stable means for communicating angular motion of the aircraft about the longitudinal axis of the stable base from the said base to the direction indicator, and means for communicating angular motion of the aircraft about the lateral axis of the stable base to the depression angle indicator.

5. In a bombing system for use with aircraft, a sight, a depression angle indicator controlled by the sight including graduations and a pointer capable of recording true deviations of the line of sight from the horizontal or vertical, duplicate members and means connecting the duplicate members whereby when one member is placed opposite a graduation representing a given angle, the other member will be opposite the graduation representing the angle whose tangent is equal to one half the tangent of the given angle, means for forming electric circuits respectively in contact with the pointer and with each of the setting members, and means for closing the circuits as the pointer coincides with the graduation opposite each setting member.

6. In apparatus of the character described, in combination, a sight mounted for movement about a horizontal axis and about a second axis at a right angle to the horizontal axis and to the axis of the telescope, a direction indicator, a stable base, a depression angle indicator, and operative connections actuated by the sight and stable base to control the direction indicator and the depression angle indicator.

7. In apparatus of the character described, in combination, a sight mounted for movement about a horizontal axis and about a second axis at a right angle to the horizontal axis and to the axis of the telescope, a direction indicator, a depression angle indicator, means for transmitting movement of the sight about the horizontal axis to the depression angle indicator, means for transmitting the movement of the sight about the second axis, to the direction indicator.

8. In apparatus of the character described for use in aircraft, in combination, a sight mounted for movement about a horizontal axis and about a second axis at a right angle thereto, a direction indicator, a stable base, a depression angle indicator, means for transmitting movement of the sight about a horizontal axis to the depression angle indicator and to the direction indicator, means for transmitting movement of the sight about the second axis to the direction indicator, means controlled by the stable base for transmitting lateral rolling movement of the craft to the direction indicator and means controlled by the stable base for transmitting fore and aft pitching movement of the craft to the depression angle indicator.

9. In apparatus of the character described for use in aircraft, in combination, a sight mounted for movement about a horizontal axis and about a second axis at a right angle thereto, a direction indicator, a stable base, a depression angle indicator, means for transmitting movement of the sight about the horizontal axis to the depression angle indicator, means for transmitting movement of the sight about the second axis to the direction indicator, means controlled by the stable base and by movement of the sight about a horizontal axis for modifying the movement transmitted to the direction indicator to compensate for lateral roll of the craft.

10. In apparatus of the character described for use in aircraft, in combination, a sight mounted for universal pivotal movement, a direction indicator, a stable base, means for transmitting lateral pivotal movement of the sight to the direction indicator, and means controlled by the vertical pivotal movement of the sight and by the stable base for modifying the effect of the first mentioned means.

11. In apparatus of the character described for use in aircraft, in combination, a sight mounted for vertical and lateral pivotal movement on a fixed support, a direction indicator, a stable base, a depression angle indicator and operative connections actuated by the sight and stable base to control the direction indicator and the depression angle indicator together with means for rotating the sight and stable base through an angle corresponding to the angle of drift.

12. In apparatus of the character described, in combination, a sight; a timing device, a depression angle indicating element; means controlled by the sight to actuate said element to indicate the angle of depression of the sight; means cooperating with the depression angle indicating element operative in predetermined positions of the sight as it follows the target to set the timing device to indicate the rate of approach to and the moment of passing over the target.

13. In apparatus of the character described for use in aircraft, in combination, a sight; a depression angle indicating element; means controlled by the sight for actuating the element to indicate the angle of depression of the sight; a timing device; means controlled by the depression angle indicating element for starting the timing device from zero; and means controlled by the depression angle indicating element operative when the craft has traversed one half of the distance toward the target for reversing the timing device.

14. In apparatus of the character described, in combination, a depression angle indicator; a timing device; means operative when the depression angle indicator indicates a predetermined angle to start a timing device in operation; and means operative when the depression angle indicator indicates an angle whose tangent is one half the tangent of the first mentioned angle for reversing the timing device.

15. In apparatus of the character described, a movable sight; a timing device having an element movable to predetermined position to indicate the moment of passing above a target; and means controlled by movement of the sight when trained on the target to set said timing device in operation to operate said element.

16. In apparatus of the character described, in combination, a sight; a timing device including a clock mechanism; means controlled by the sight for setting in operation the timing device; and means adapted to be set relative to the timing device to indicate in conjunction with said device the time of release of the bomb.

17. In apparatus of the character described, in combination, a movable sight; a stable base; a depression angle indicator mechanism controlled by said sight and stable base; a timing device having a movable element; and means associated with said depression angle indicator mechanism for setting said timing device to cause said movable element to approach gradually a predetermined position at a rate corresponding to the rate of approach of the craft to the target.

18. In apparatus of the character described, in combination, a movable sight; a stable base; a depression angle indicator mechanism controlled by said sight and stable base; a timing device having a movable element; means associated with said depression angle indicator mechanism for setting said timing device to cause said movable element to approach gradually a predetermined position at a rate corresponding to the rate of approach of the craft to the target; and an element adapted to be set relative to the path of movement of said movable element to indicate the time of release of a bomb.

19. In apparatus of the character described, in combination, a movable sight; a stable base; a depression angle indicator controlled by said sight and stable base; a timing device; means controlled by said depression angle indicator for setting in operation said timing device at a predetermined time with relation to the approach to the target; and means controlled by said timing device arranged to be set to indicate the time of release of a bomb during the approach to the target.

20. In apparatus of the character described a sighting instrument comprising, in combination, a support, a cradle rotatably mounted on said support to rotate about a vertical axis, a yoke mounted in said cradle to rotate about a horizontal axis, a shaft mounted in said yoke and extending at right angles to the axis of the yoke, a sight rigidly secured to said shaft, a shaft extending through a trunnion of said yoke and geared to the aforesaid shaft, a transmitter carried by said yoke connected to be actuated by the second mentioned shaft, a second transmitter and a shaft rigidly secured to said yoke for actuating said second transmitter.

21. A sight cradle rotatable on a vertical axis, a yoke pivoted on a horizontal axis on said cradle, said yoke having trunnions supported in said sight cradle, a transmitter carried by one trunnion of said yoke and gearing between said sight and transmitter comprising a shaft extending through said trunnion, whereby the transmitter is actuated upon lateral movement of the sight, a transmitter carried by the sight cradle and gearing between said yoke and transmitter to actuate the latter upon pivotal movement of the yoke.

22. In apparatus of the character described, a direction indicator comprising, in combination, a support, an indicator mounted thereon, a differential mechanism for actuating said indicator, a motor connected to actuate one element of said differential mechanism, a swinging arm connected to actuate another element of said differential mechanism, a second swinging arm and means to actuate the same, a connection between said swinging arms and means for adjusting said connection to vary the ratio of power transmission between said arms.

23. In apparatus of the character described, a direction indicator comprising, in combination, a support, an indicator mounted thereon, a differential mechanism for actuating said indicator, means for actuating one element of said differential mechanism to correspond to lateral movement of the sight relative to the craft, a swinging arm, means for swinging said arm to correspond to the roll of the craft, and means controlled by the movement of said arm for actuating another element of said differential mechanism.

24. In apparatus of the character described, a direction indicator comprising, in combination, a support, an indicator mounted thereon, a differential mechanism for actuating said indicator, means for actuating one element of said differential mechanism to correspond to lateral movement of the sight relative to the craft, and means for actuating another element of said differential mechanism to correspond to lateral roll of the craft.

25. In apparatus of the character described for use in aircraft, a direction indicator comprising, in combination, a support, an indicator mounted thereon, a differential mechanism for actuating said indicator, means for actuating one element of said differential mechanism to correspond to the lateral movement of the sight relative to the craft, a swinging arm, means for swinging said arm to correspond to the roll of the craft, means controlled by the movement of said arm for actuating another element of said differential mechanism, and means for modifying the effect of the last mentioned means in accordance with the relative position of the craft and target.

26. In apparatus of the character described, in combination, a movable sight; a direction indicator; a differential mechanism connected to actuate the indicator, means for actuating one element of said differential mechanism in accordance with the lateral movement of a sight, means for actuating another element of said differential mechanism in a degree normally corresponding to the angle of roll, means for modifying the effect of the last mentioned actuating means in accordance with the angle of depression of the sight.

27. In apparatus of the character described, in combination, a movable sight, a direction indicator, a differential mechanism actuating said indicator, means under control of the sight for actuating one element of said differential mechanism, a movable element actuated in accordance with the roll of the craft, connections between said movable element and the differential mechanism arranged to actuate said differential mechanism, said last mentioned means being adjustable to correspond to the angle of depression of the sight to transmit a greater or lesser movement to said differential mechanism.

28. In apparatus of the character described, in combination, a movable sight, a direction indicator, a differential mechanism connected to actuate the indicator, means controlled by lateral movements of the sight to actuate one element of the differential mechanism, a swinging arm, means for swinging said arm through an angle corresponding to the angle of roll of the craft, a follower member adjustably connected to said arm and arranged to actuate another element of said differential mechanism, and means for adjusting said follower to different positions along said arm to correspond to different angles of depression of the sight.

29. In apparatus of the character described, in combination, a movable sight, a direction indicator, a differential mechanism connected to actuate the indicator, means controlled by lateral movements of the sight to actuate one element of the differential mechanism, a swinging arm, means to actuate the same to correspond to the roll of the craft, a follower slidable on said arm and actuating means connecting said follower to another element of said differential mechanism, a traveling bridge extending transversely of said arm when in normal position slidably engaging the follower, and means for moving said bridge laterally to different positions to correspond to different angles of depression of the sight.

30. In apparatus of the character described, in combination, a sight, a rotatable direction indicating element, differential mechanism connected to actuate the same, a motor connected to actuate one element of said differential mechanism, a swinging arm, a motor and gearing for swinging said arm, a laterally movable bridge having a guideway, a follower engaging said bridge and said swinging arm, and sight-controlled means for moving said bridge to various positions corresponding to different angles of depression of the sight and means controlled by said follower for actuating an element of said differential mechanism.

31. In apparatus of the character described, a direction indicating element means forming a guideway, means for moving said guideway means to various positions corresponding to different angles of roll of the craft, means forming a second guideway and means for moving said last-named guideway means to different positions adjacent the first mentioned guideway to correspond to different angles of depression of the line of sight to the target, a follower engaging and controlled by said guideways, and means controlled by said follower for actuating the direction indicating element.

32. In apparatus of the character described for use in aircraft, in combination, a direction indicating element, a swinging arm, means for moving said arm to either side of a normal position to correspond to the roll of the craft, means having a guideway extending transversely of the normal position of said arm, means for actuating said transverse guideway means toward and from the pivot of said arm, a follower controlled by said arm and guideway, and means controlled by the follower for actuating the direction indicating element.

33. In apparatus of the character described for dropping bombs from an aircraft, the combination with a sight of a stable base comprising a support, a gyroscope mounted thereon to rotate on a vertical axis, a trunnioned member arranged to extend longitudinally of the craft and engaged by said gyroscope to be moved laterally relative to said support upon relative lateral rolling movement between said gyroscope and support, and a second trunnioned member arranged to extend transversely of the craft engaged by said gyroscope to be oscillated relative to the support upon relative pitching movement between said gyroscope and craft, and means controlled by the sight and said second trunnioned member to indicate the angle of depression of the sight.

34. In apparatus of the character described for dropping bombs from an aircraft, the combination with a sight of a stable base comprising a rotatable support; a gyroscope rotatable on a vertical axis, mounted for universal pivotal movement relative to said support; a yoke trunnioned on a longitudinal axis and means for causing the yoke to rotate about its trunnion under control of said gyroscope; a second yoke trunnioned on a transverse axis and means for causing said yoke to rotate about its trunnion under control of the gyroscope; and means for rotating the support to bring the trunnioned yokes into predetermined relation to the direction of travel of the craft together with depression angle indicating means controlled by the sight and stable base.

35. In apparatus of the character described for dropping bombs from an aircraft, the combination with a sight of a stable base comprising a support, a gyroscope rotatable on a vertical axis and mounted for universal pivotal movement relative to the support, motion transmitting means controlled by lateral movement of the gyroscope relative to the support in one plane, and a second motion transmitting means controlled by lateral movement of the gyroscope relative to the support in a plane at right angles to the first mentioned plane and a pilot's director and means controlled by the sight and the first and second motion transmitting means for actuating said pilot's director to indicate the true direction of travel of the craft.

36. In apparatus of the character described for dropping bombs from an aircraft, the combination with a sight of a stable base comprising a support, a gyroscope mounted for universal pivotal movement thereon, gearing actuated by relative pivotal movement laterally of the craft between the gyroscope and the support, and gearing actuated by relative pivotal movement longitudinally of the craft between the gyroscope and the support and a pilot's director and means controlled by the sight and both said gearings for rotating said pilot's director.

37. A stable base of the character described for use in a movable craft comprising, in combination, a rotatable support, a gyroscope mounted for universal pivotal movement thereon, gearing actuated by relative pivotal movement laterally of the craft between the gyroscope and the support, gearing actuated by relative pivotal movement longitudinally of the craft between the gyroscope and the support, a drift indicating device, and means controlled by the drift indicating device for rotating the support through an angle corresponding to the indicated drift.

38. A stable base comprising a rotatable support, a stable element mounted on said support, a transmitter and means controlled by the relative movement between the stable element and the support in one direction for actuating said transmitter comprising a differential mechanism, means for rotating said support through an angle corresponding to the angle of drift, and means actuated by the rotation of said support for actuating an element of said differential mechanism to modify the effect of the actuation of said transmitter.

39. In apparatus of the character described for use in aircraft, in combination, a support; a gyroscope mounted on said support to rotate on a vertical axis; a transmitter and means actuated by the relative movement between the gyroscope and the support in a direction longitudinally of the craft to actuate said transmitter; a second transmitter; means controlled by the relative lateral rolling movement between the gyroscope and the support to actuate the second transmitter comprising a differential mechanism; and means co-acting with said differential mechanism for modifying the action of said transmitter.

40. In apparatus of the character described for use in aircraft, in combination, a rotatable support, a gyroscope mounted on said support to rotate on a vertical axis, a transmitter, differential mechanism to actuate the same, means controlled by the relative lateral rolling movement between the gyroscope and the support to actuate one element of said differential mechanism, means for rotating said support through an angle corresponding to the angle of drift, and means controlled by the rotation of the support for actuating a second element of said differential mechanism.

41. In apparatus of the character described for use in aircraft, in combination, a rotatable support, a gyroscope mounted on said support to rotate on a vertical axis, a transmitter, differential mechanism to actuate the same, means controlled by the relative lateral rolling movement between the gyroscope and the support to actuate one element of said differential mechanism, means for rotating said support, through an angle corresponding to the angle of drift, means controlled by the rotation of the support for actuating a second element of said differential mechanism and devices adjustable for differences of altitude or air speed for varying the extent of actuation of said last mentioned means upon said differential.

42. In apparatus of the character described, in combination, a movable sight; a stable base; a depression angle indicator comprising a movable element and a differential mechanism actuating the same; means controlled by the site for actuating one element of said differential mechanism; and means controlled by the stable base for actuating another element of said differential mechanism.

43. In apparatus of the character described, in combination, a sight comprising a rotatable sight cradle, a stable base comprising a rotatable support, a depression angle indicator comprising a movable element and a differential mechanism actuating the same, means controlled by the angle of depression of the sight for actuating one element of said differential mechanism, means controlled by the stable base for actuating another element of the differential mechanism, and means for rotating the sight cradle and the stable base through equal angles corresponding to the angle of drift.

44. A depression angle indicator comprising, in combination, a support, an indicator element movable relative to said support, a sight movable independently of said indicator element, differential mechanism arranged to actuate said indicator element, independent means one of which is controlled by said sight arranged to actuate different elements of said differential mechanism independently, and an electric circuit arranged to be closed by said indicator element at a predetermined point in its movement.

45. In apparatus of the character described, in combination, a pivoted depression angle indicating element, a pair of adjustable indicators positioned adjacent the path of movement of said depression angle indicating element, means connecting said indicators and controlling the relative movement thereof whereby when one is positioned to indicate a predetermined angle the other will be positioned to indicate an angle whose tangent is one half the tangent of the first angle.

46. In apparatus of the character described, in combination, a depression angle indicating hand rotatable about a central pivot, a pair of indicator arms adjustable about said pivot and arranged to be positioned adjacent the path of movement of said hand and means for controlling the relative movement of said arms whereby one arm indicates an angle whose tangent is a predetermined fraction of the tangent of the angle indicated by the companion hand.

47. In apparatus of the character described, in combination, a pair of slotted arms pivoted about a common center, a slide having pins engaging said slotted arms and movable along a line passing to one side of the pivot to simultaneously control the movement of both arms, a graduated dial, a pair of indicators movable adjacent said dial and controlled by said slotted arms to indicate angles whose tangents bear a predetermined relation to each other.

48. In apparatus of the character described, in combination, a pair of slotted arms pivoted about a common center, a slide having pins engaging said slotted arms and movable along a line passing to one side of the pivot to simultaneously control the movement of both arms, the arrangement being such that the tangent of the angle of one arm with a line parallel to the path of movement of the slide is equal to one half of the tangent of the angle of the other slotted arm with said line.

49. In apparatus of the character described for use in aircraft, in combination, a direction indicating element, swinging arms mounted on spaced pivots normally overlying each other on a line connecting the pivots, means for actuating the first of said arms to one side or the other as the craft rolls laterally, a follower movable along both arms and operatively connecting the same, means for moving the follower farther from the pivot of the actuated arm as the craft approaches a target, and operative connections between the second arm and the direction indicating element.

50. In apparatus of the character described for use in aircraft, in combination, a direction indicating element, swinging arms mounted on spaced pivots and normally overlying each other on a line connecting the pivots, means for actuating the first of said arms to one side or the other as the craft rolls laterally, a follower movable along both arms and operatively connecting the same, a bridge extending transversely to the line connecting the pivots and engaging the follower, and means for moving said bridge laterally as the angle of depression of the line of sight varies.

51. In apparatus of the character described, a sight pivotally mounted for universal movement, an indicator located at a distance from the sight and controlled to indicate movements of the sight and means to correct the indications whereby the indicator will show the true angle of depression of the sight from the true horizontal.

52. In apparatus of the character described, a sight, a stable base, said sight and stable base being independent of each other and means controlled jointly by the sight and stable base to indicate true changes in direction of the sight in a horizontal plane.

53. In an apparatus for use in directing the flight of an aircraft, in combination a sight support, a separate drift indicator comprising a support, a rotatable frame thereon and means to rotate said frame relative to the support, a transmitter connected to be actuated by rotation of said frame, means actuated by the transmitter to rotate the sight support and a compass needle pivotally supported concentric with said rotatable frame.

54. In an apparatus for use in directing the flight of an aircraft, the combination with a sight mounted on a rotatable base of an independent rotatable support, a compass needle and a rotatable frame rotatably mounted on said support, a rotatable graduated ring in said frame adjacent said compass needle and means for rotating the frame on its support together with transmitting mechanism means actuated thereby to rotate the sight support simultaneously with rotation of the frame substantially as and for the purpose described.

55. In apparatus of the character described, in combination a sight, a stable base, said sight and stable base being independent of each other, means controlled by the sight and stable base for giving indication when the sight indicates a predetermined angle of depression from the true horizontal.

56. In apparatus of the character described, in combination a sight mounted on a fixed support for movement about a horizontal axis and about a second axis at right angles thereto, a direction indicator, a stable base mounted independently of the sight, a depression angle indicator, and operative connections actuated by the sight and stable base to control the direction indicator and the depression angle indicator.

57. In apparatus for the character described, a sight, a stable base, a pilot's director and means controlled by the sight and stable base jointly for actuating the pilot's director to indicate the deviations to right or left of a predetermined direction of flight.

58. In flight directing apparatus for use in aircraft, in combination a gyroscope arranged to maintain a constant vertical line of reference, a sight arranged to be trained upon an objective, means cooperating with the gyroscope to establish a line of reference inclined to the vertical transversely of the craft, a pilot's director, and means cooperating with the sight and with the first mentioned means to actuate the pilot's director to indicate deviation in flight from the plane thru the line of sight to the target and the inclined line of reference.

59. In a sighting system for use with aircraft, a stable base including a gyroscope and differential train, means for adjusting the differential train independently proportionately to the angle of rotation of the longitudinal axis of said base from a line parallel to the longitudinal axis of the aircraft, said means including a connection adjustable in accordance with the altitude and air speed, means for adjusting the differential train to change the normal position thereof to give, in effect, an inclination to the artificial vertical of the stable base and a connection between said train and gyroscope as and for the purposes described.

60. In a sighting system for use with aircraft, a stable base mounted for rotation on a vertical axis and adapted to maintain a true vertical line of reference, a transmitter, means connecting said stable base to said transmitter to actuate the same proportional to component angular movements of the craft about one horizontal axis, means for additionally actuating the transmitter proportionately to the angle of rotation of said base about said vertical axis, means for modifying the action of said additional means in accordance with altitude and air speed, and manually operated means for adjusting the transmitter to change the zero position thereof.

61. In apparatus of the character described for use in aircraft, a movable sight, a pilot's director, means for transmitting lateral movement of the sight to the pilot's director, means to modify the indications of the pilot's director in accordance with altitude and drift angle to cause the pilot to follow a line of travel above but a predetermined distance to one side of a target on which the sight is trained.

62. In apparatus of the character described for use in aircraft, a movable sight, a pilot's director, means for transmitting lateral movement of the sight to the pilot's director, a drift indicator and means responsive to adjustments of the drift indicator to modify the indications of the pilot's director in accordance with altitude and drift angle to cause the pilot to follow a line of travel above but to one side of the target upon which the sight is trained a distance proportional to the angle of drift.

63. In apparatus of the character described for use in aircraft, a movable sight, a pilot's director, means for transmitting lateral movement of the sight to the pilot's director to normally indicate a path of travel in a vertical plane passing through a target on which the sight is trained, means adjustable to correspond to the drift for modifying the indications of the pilot's director in accordance with altitude and drift angle to cause the pilot to follow a line of travel above but in a plane determined by the craft and a line thru the target parallel to the craft's ground track, which plane is inclined to the vertical a predetermined amount.

ALEXANDER PROCOFIEFF-SEVERSKY.